United States Patent [19]

Obayashi et al.

[11] Patent Number: 4,957,818

[45] Date of Patent: Sep. 18, 1990

[54] MOLDED SYNTHETIC RESIN PRODUCT

[75] Inventors: Atsushi Obayashi; Yuji Takeda; Kazuya Kinoshita, all of Nagoya, Japan

[73] Assignee: Mitsubishi Kasei Vinyl Company, Tokyo, Japan

[21] Appl. No.: 229,424

[22] Filed: Aug. 8, 1988

[30] Foreign Application Priority Data

Aug. 14, 1987 [JP] Japan .............................. 62-202790
Oct. 8, 1987 [JP] Japan .............................. 62-253965
Jan. 19, 1988 [JP] Japan .............................. 63-9386
Mar. 28, 1988 [JP] Japan .............................. 63-73512
Mar. 28, 1988 [JP] Japan .............................. 63-73513

[51] Int. Cl.$^5$ .................. B32B 7/02; B32B 27/30; C08J 7/04
[52] U.S. Cl. ................. 428/451; 428/447; 428/412; 428/421; 428/424.4; 428/476.1; 428/473.5; 428/516; 428/518; 428/502; 428/425.5
[58] Field of Search ............ 428/518, 500, 451, 447

[56] References Cited

FOREIGN PATENT DOCUMENTS

| 53-045222 | 12/1978 | Japan . |
| 61-258811 | 11/1986 | Japan . |
| 562104885-A | 5/1987 | Japan . |
| 63-186742 | 8/1988 | Japan . |
| 63-188045 | 8/1988 | Japan . |
| 501004312-A | 1/1989 | Japan . |
| 501156060-A | 6/1989 | Japan . |

*Primary Examiner*—P. C. Sluby
*Attorney, Agent, or Firm*—Oblon, Spivak, McClelland, Maier & Neustadt

[57] ABSTRACT

A molded synthetic resin product comprising a synthetic resin substrate and a coating layer formed by heat treatment on the surface of the substrate, said coating layer comprising, as main components, (A) a silane compound having a hydrolyzable group directly bonded to a silicon atom, and (B) an acrylic resin obtained by polymerizing a monomer selected from the group consisting of alkyl (meth)acrylates, or a mixture of such a monomer with an alkenyl benzene monomer, and a copolymerizable $\alpha,\beta$-ethylenically unsaturated monomer.

6 Claims, No Drawings

MOLDED SYNTHETIC RESIN PRODUCT

The present invention relates to a molded synthetic resin product comprising a synthetic resin substrate with its surface treated. More particularly, it relates to a molded synthetic resin product having excellent stain resistance and durability.

Synthetic resins have been used in various fields. However, they have a drawback that they are easily stained. For example, when a copy taken by an electrostatic copying machine or by a heat sensitive copying machine is inserted into a paper holder or desk mat made of a synthetic resin, or it is kept therein, if the printed surface of the copy is brought in contact with a transparent cover of the paper holder or desk mat, the printing ink is likely to be transferred to the cover in a short period of time to stain the cover, or in an extreme case, the printed surface adheres to the cover whereby the copy is damaged Such a phenomenon is particularly likely when the synthetic resin is a soft vinyl chloride resin, since the plasticizer is likely to bleed out on the surface of the molded product.

Further, there has been a problem that when a molded product of a vinyl chloride resin is in contact with a molded product of e.g. an ABS resin or a styrene resin, the plasticizer is likely to be transfered to stain the contacted resin product.

In order to solve such a problem, it has been proposed to cover the surface of the molded synthetic resin product containing a vinyl chloride resin with a certain specific resin or coating material. For example, Japanese Unexamined Patent Publication No. 74156/1981 proposes a method wherein an epoxy resin coating composition is coated on the surface of a molded synthetic resin product to form a coating film. Further, Japanese Unexamined Patent Publications Nos. 57954/1983, 176330/1984 and 38105/1984 propose a method of forming a fluorine resin type coating composition into a film,, and Japanese Unexamined Patent Publication No. 105057/1984 proposes a method of forming a silicone resin-type coating composition into a film.

However, the coating film formed on the surface of a molded product by each of such improved methods is composed essentially of a thermoplastic resin. Therefore, if the atmospheric temperature during its use is high, it is difficult to completely prevent the surface staining, and the problem has remained unsolved.

In order to overcome such a drawback, Japanese Unexamined Patent Publication No. 12701/1984 proposes a method of forming a cross-linked acrylic rubber layer on the surface. Further, Japanese Examined patent Publication No. 57485/1982 proposes a method of froming on the surface a film of a cured product of a silicon resin under irradiation. However, the coating layers obtained by these methods are hard and brittle, and they can not follow the deflection of the molded product i.e. the substarate, whereby cracking is likely to form in the coating layers, and the coating layers are likely to be peeled or fall off as time passes. Thus, there has been a problem that a constant effect for stain resistance over a long period of time can not adequately be obtained.

The present inventors have conducted extensive research with an aim to solve the above-mentioned conventional problems and to provide a molded synthetic resin product whereby the surface staining of the molded product can effectively be prevented, and have finally accomplished the present invention.

According to the present invention, the above problems are solved by forming a coating layer on the surface of a synthetic resin substrate by heat treatment of a coating composition composed mainly of a silane compound having a hydrolyzable group directly bonded to a silicon atom and a certain specific acrylic resin.

The present invention provides a molded synthetic resin product comprising a systhetic resin substrate and a coating layer formed by heat treatment of a composition on the surface of the substrate, said coating composition comprising (A) a silane compound having a hydrolyzable group directly bonded to a silicon atom, and (B) an acrylic resin obtained by polymerizing a monomer selected from the group consisiting of alkyl (meth)acrylates, or a mixture of such a monomer with an alkenyl benzene monomer, and a copolymerizable $\alpha,\beta$-ethylenically unsaturated monomer. Here, "alkyl (meth)acrylates" cover alkyl acrylates and alkyl methacrylates.

Now, the present invention will be described in detail with reference to the preferred embodiments.

The synthetic resin in the present invention may be selected from thermoplastic resins and thermosetting resins without any particular restriction. For example, it includes low density polyethylene, high density polyethylene, linear low density polyethylene, polypropylene, polyvinyl alcohol, polyvinylidene chloride, saturated polyester, a methacrylate resin, an AS resin, an ABS resin, a nylon resin, polyacetal, polycarbonate, polyacrylate, polyvinyl acetate, an ethylene-vinyl acetate resin, polyphenyleneoxide, polysulfone, polyphenylenesulfide, a fluorine resin, a phenol resin, a urea resin, an unsaturated polyester resin, an epoxy resin, a melamine resin, a diallyphthalate resin, a silicone resin, a polyimide resin and polyurethane FRP.

The present invention is particularly effective for the prevention of the migration of e.g. a plasticizer to the surface and for the prevention of the surface staining of a molded product, when the synthetic resin is a vinyl chloride resin.

In the present invention, the vinyl chloride resin means polyvinyl chloride and a copolymer composed mainly of vinyl chloride. The monomer copolymerizable with vinyl chloride includes vinyl esters, vinyl ethers, acrylic acid and methacrylic acid and esters thereof, maleic acid and fumaric acid and esters thereof, maleic anhydride, an aromatic vinyl compound, a vinylidene halide compound, acrylonitrile, methacrylonitrile, ethylene and propylene. A small amount of a poly functional group-containing compound may be added to such a monomer for partial cross linking. Such a vinyl chloride resin may be produced by any one of conventional processes such as emulsion polymerization, suspension polymerization, solution polymerization and bulk polymerization.

In view of the molding processability and the strength of the molded product, such vinyl chloride resin may be a homopolymer or a copolymer, or a blend of two or more resins.

In order to impart flexibility to the vinyl chloride resin for the substrate, a plasticizer is incorporated in an amount of at least 20 parts by weight, preferably from 30 to 100 parts by weight, relative to 100 parts by weight of this resin. By selecting the amount of the plasticizer within the above range, excellent flexibility and mechanical properties can be imparted to the intended molded product of a soft vinyl chloride resin.

The plasticizer includes phthalates such as di-n-octyl phthalate, di-2-ethylhexyl phthalate, dibenzyl phthalate, diisodecyl phthalate, didodecyl phthalate and diundecyl phthalate; esters of aliphatic dibasic acids such as dioctyl adipate, di-n-butyl adipate and dibutyl sebacate; glycol dibenzoate; fatty acid esters such as metyl acetylricinolate; epoxidized oils such as epoxidized soybean oil and epoxidized linseed oil; citrates such as acetyltributyl citrate, acetyltrioctyl citrate and tri-n-butyl citrate; trialkyl trimellitates; tetra-n-octyl pyromellitate; polypropylene adipate; and other polyester plasticizers. These plasticizers may be employed alone or in combination as a mixture of two or more different kinds.

In addition to the above plasticizer, conventional resin additives commonly incorporated to molding resins, such as a heat stabilizer, an antioxidant, a lubricant, a thickener, an antistatic agent, a surfactant, an ultraviolet absorber, a photostabilizer, a pigment or a dye, may also be incorporated to the vinyl chloride resin, as the case requires For blending the plasticizer and other conventional resin additives to obtain a moldiong vinyl chloride resin blend composition, it is possible to employ a conventional blending and mixing technique by means of e.g. a ribbon blender, a Bambury mixer, a super mixer or any other blending or mixing machine.

The vinyl chloride resin blend composition is molded to obtain a molded synthetic resin product of the present invention. There is no particular restriction as to the shape of the molded product. However, from the efficiency of the step for forming the coating layer, a sheet form, a film form, a plate form or a tubular form is suitable. Such a molding method is suitably selected from conventional molding methods such as calender molding, extrusion molding, inflation molding, injection molding and casting. In the present invention, the silane compound (A) means a silane compound having a hydrolyzable group directly bonded to a silicon atom.

Specifically, it includes monomers or polymers of amino alkylalkoxy silanes such as aminomethyltriethoxy silane, N-$\beta$-aminoethylaminomethyltrimethoxy silane, $\gamma$-aminopropyltrimethoxy silane, N-(trimethoxysilylpropyl)-ethylenediamine and N-(dimethoxymethylsilylpropyl)-ethylenediamine; epoxyalkylalkoxy silanes such as $\gamma$-glycidoxypropyltrimethoxy silane, $\gamma$-glycidoxypropylmethyldimethoxy silane, $\beta$-(3,4-epoxycyclohexyl)ethyltrimethoxy silane and $\beta$-(3,4-epoxycyclohexyl)ethylmethyldimethoxy silane; mercaptoalkylalkoxy silanes such as $\gamma$-mercaptopropyltrimethoxy silane and $\gamma$-mercaptopropylmethyldimethoxy silane; tetraalkoxy silanes such as tetramethoxy silane, tetraethoxy silane, tetrabutoxy silane, trimethoxyneopentoxy silane, dimethoxyiethoxy silane, trimethoxy-n-proxy silane, dimethoxydineopentoxy silane and bis(2-ethylhexoxy)diethoxy silane; alkyltrialkoxy silanes such as methyltrimethoxy silane, methyltriethoxy silane, ethyltrimethoxy silane and ethyltriethoxy silane; dialkyldialkoxy silanes such as dimethyldimethoxy silane and dimethyldiethoxy silane; halogenated alkylalkoxy silanes such as $\gamma$-chloropropyltrimethoxy silane and 3,3,3-trichloropropyltrimethoxy silane; alkylacyloxy silanes such as methyltriacetoxy silane and dimethyldiacetoxy silane; hydro silanes such as trimethoxy silane and triethoxy silane; and unsaturated group-containing silane compounds such as vinyl trimethoxy silane, vinyl ethoxy silane, vinyl tris($\beta$-methoxyethoxy) silane, allyltriethoxy silane, $\gamma$-(meth)acryloxypropyltrimethoxy silane, $\gamma$-(meth)alkyloxypropyltriethoxy silane and $\gamma$-(meth)alkoxypropylmethyldimethoxy silane, and hydrolyzates thereof.

A hydrolyzate may be prepared, for example, by adding water to a silane compound having a hydrolyzable group in the presence of an acid or alkali catalyst in an alcohol-incorporated system. When water in an amount of at least equivalent to the silane compound having a hydrolyzable group is added, a completely hydrolyzed alcoholic silica gel or silica zol-siloxane composite product is obtained. If the water is added in an amount of less than equivalent, a partially hydrolyzed product corresponding to the amount will be prepared.

Among these silane compounds, particularly preferred is a monomer or polymer of a tetraalkoxy silane of the formula $(R^1O)_3Si[OSi(OR^2)_2]_n(OR^3)$ wherein each of $R^1$, $R^2$ and $R^3$ which may be the same or different, is an alkyl group, an aryl group, an alkylaryl group, an arylalkyl group, an aryloxyalkyl group or an alkyloxyalkyl group, and n is 0 or a positive integer, or such a compound with its hydrolyzable group hydrolyzed. Among them, particularly preferred is a compound of the formula
wherein each of $R^1$, $R^2$ and $R^3$ which may be the same or different is an alkyl group having not more than 4 carbon atoms.

These silane compounds may be used alone or in combination as a mixture of two or more different kinds.

The acrylic resin in the present invention is the one obtained by polymerizing a monomer selected from the group consisting of alkyl esters of acrylic and methacrylic acids (hereinafter referred to as alkyl (meth)acrylates) or a mixture of such a monomer with an alkenyl benzene monomer, and a copolymerizable $\alpha,\beta$-ethylenically unsaturated monomer under usual polymerization conditions.

The alkyl (meth)acrylates which may be used in the present invention include, for example, methyl acrylate, ethyl acrylate, n-propyl acrylate, isopropyl acrylate, n-butyl acrylate, 2-ethylhexyl acrylate, decyl acrylate, methyl methacrylate, ethyl methacrylate, n-propyl methacrylate, isopropyl methacrylate, n-butyl methacrylate, 2-ethylhexyl methacrylate and decyl methacrylate.

Usually, an alkyl acrylate with the carbon number of the alkyl group being from 1 to 20 and/or an alkyl methacrylate with the carbon number of the alkyl group being from 1 to 20 may be employed.

The alkenyl benzene which may be used in the present invention includes, for example, styrene, $\alpha$-methylstyrene and vinyl toluene.

When a monomer mixture comprising such an alkenyl benzene and an alkyl (meth)acrylate is used, it is usually preferred to employ the alkyl (meth)acrylate in an amount of at least 10% by weight, although the amount may vary depending upon the amount of the $\alpha,\beta$-ethylenically unsaturated monomer.

The copolymerizable $\alpha,\beta$-ethylenically unsaturated monomer used to obtain the acrylic resin of the present invention includes, for example, $\alpha,\beta$-ethylenically unsaturated carboxylic acids such as acrylic acid, methacrylic acid, maleic acid, maleic anhydride, fumaric acid, crotonic-acid and itaconic acid; $\alpha,\beta$-ethylenically unsaturated sulfonic acids such as ethylene sulfonic acid; 2-acrylamide-2-methylpropanoic acid; α,β-ethylenically unsaturated phosphonic acid; acrylamides; aminoesters of acrylic and methacrylic acids; glycidylesters of acrylic and methacrylic acids; and salts of acrylic and methacrylic acids. These monomers may be used alone or in combination as a mixture of two or more different kinds.

As a polymerization initiator which may be used for the production of the acrylic resin of the present invention, a persulfate such as ammonium persulfate or potassium persulfate; or an organic peroxide such as acetyl peroxide or benzoyl peroxide may be mentioned. Such a polymerization initiator is used in an amount within a range of from 0.1 to 10% by weight relative to the total amount of the charged monomers.

The acrylic resin may be prepared by any polymerization method such as bulk polymerization, solution polymerization, suspension polymerization or emulsion polymerization. To the acrylic resin thus obtained, a compound such as a vinyl chloride/vinyl acetate resin, a vinyl chloride resin or a cellulose ether may further be incorporated.

In the coating composition, the blending ratio by weight of the silane compound (A) and the acrylic resin (B) is within a range of from 20:1 to 1:15. If the proportion of the silane compound (A) exceeds the above range, the coating layer formed on the molded product tends to be brittle, and the adhesion to the substrate tends to be poor, thus leading to peeling, such being undesirable. On the other hand, if the proportion of the acrylic resin (B) exceeds the above range, no adequate effect for stain resistance tends to be obtained. Among the above range, particularly preferred is the ratio of (A) to (B) within a range of from 15:1 to 1:10. To the above composition, a liquid dispersing medium may further be incorporated as the case requires. Such a liquid dispersing medium includes monohydric alcohols such as methyl alcohol, ethyl alcohol and isopropyl alcohol; polyhydric alcohols such as ethylene glycol, diethylene glycol and glycerol; cyclic alcohols such as dibenzyl alcohol, cellosolve acetates and ketones.

These liquid dispersing media may be used alone or in combination. They may be suitabliy selected taking into accounts the dispersion stability of the coating composition, the wettability of the surface of the molded product in the case where a coating method is employed, the efficiency or difficulty in the removal of the liquid dispersing medium and the economical aspects.

To the coating composition, usual additives such as a small amount of an acid or an alkali, a defoaming agent, a surfactant, a lubricant, an antistatic agent, an antioxidant, a ultraviolet absorber, a photostabilizer, a film-forming adjuvant, a thickener, a pigment, a pigment dispersant, a fungicide, an algae-preventing agent and an inorganic filler, may be incorporated as the case requires.

Particularly preferred is to incorporate a hindered amine compound as the ultraviolet absorber, since it is thereby possible to further improve the stain resistance. In such a case, the amount to be incorporated is preferably from 0.1 to 50% by weight, based on the total amount of the silane compound (A) and the acrylic resin (B).

The above coating composition may be coated on the surface of the synthetic resin substrate by any conventional method such as a roll coating method, a dip coating method, a brush coating method, a spray coating method, a bar coating method or a knife coating method. In a case where the above coating composition is formed into a single coating layer without formulating it into a solution, a coextrusion method, an extrusion coating method, an extrusion laminating method or a laminating method may be employed.

The coating layer is formed by heat of the above coating composition on the surface of the synthetic resin substrate. The silane compound and the acrylic resin are thereby chemically bonded to each other, whereby the coating layer will be strong and will have excellent barrier properties against contaminants, and thus the stain resistance will be improved. When a coating method is used as a method for forming the coating layer, the heat treatment may be conducted by, for example, a hot air heating method, an infrared heating method or a far infrared heating method. The hot air heating method is advantageous in view of the heat treatment efficiency and safety. In this case, the temperature condition may suitably be selected within a range of from 50 to 200° C., and the time is selected within a range of from 10 seconds to 60 minutes. The amount of the solid substance of the coating layer formed by the heat treatment on the surface of the synthetic resin substrate is suitably within a range of from 0.05 to 20 $g/m^2$, preferably from 0.1 to 10 $g/m^2$.

In a case where the adhesion of the coating layer to the substrate surface is not adequate, it is advisable to modify the substrate surface, for example, by applying plasma treatment or corona discharge treatment to the substrate surface before coating the above-mentioned coating composition.

With respect to the molded synthetic resin product of the present invention, there is no particular restriction as to the shape. However, a sheet form, a film form, a plate form or a tubular form is suitable from the viewpoint of the efficiency of the process for forming the coating layer. The molding method for such a molded product may suitably be selected among usual methods such as calender molding, extrusion molding, inflation molding, injection molding and casting.

The molded synthetic resin product of the present invention has a specific coating layer formed on its surface, and this coating layer is excellent in the stain resistance. Thus, the molded synthetic resin product of the present invention maintains its beautiful outer appearance for a long period of time and is particularly useful in various fields where copies taken by electrostatic or heat sensitive copying machines are inserted or kept, such as desk mats, card holders or stationary paper holders.

Particularly when the synthetic resin is a soft vinyl chloride resin containing a substantial amount of a plasticizer, the bleeding out of e.g. the plasticizer on the surface of the molded product is suppressed, and the molded product will have the stain resistance remarkably improved. Thus, the application field of such a resin will thereby be widened.

As a specific embodiment, the present invention provides a vinyl chloride resin film for agricultural use, wherein the synthetic resin substrate is a soft vinyl chloride resin film containing an ultraviolet absorber. The ultraviolet absorber is preferably a benzophenone ultraviolet absorber or a benzotriazole ultraviolet absorber, although there is no particular restriction as to the type of the ultraviolet absorber Specifically, the following compounds may be mentioned.

Benzophenone ultraviolet absorbers include 2-hydroxy-4-methoxybenzophenone, 2,4-dihydroxybenzophenone,
2-hydroxy-4-n-octoxybenzophenone,
2-hydroxy-4-methoxy-2'-carboxybenzophenone,
2,2'-dihydroxy-4-4'-dimethoxybenzophenone,
2-hydroxy-4-benzoyloxybenzophenone,
2,2'-hydroxy-4-methoxybenzophenone,
2-hydroxy-4-methoxy-5-sulfonebenzophenone,
2,2',4,4'-tetrahydroxybenzophenone,
2,2'-dihydroxy-4,4'-dimethoxybenzophenone,
2-hydroxy-5-chlorobenzophenone and
bis-(2-methoxy-4-hydroxy-5-benzoyl)methane.

Benzotriazole ultraviolet absorbers include
2-(2'-hydroxyphenyl)benzotriazole,
2-(2'-hydroxy-5'-methyphenyl)benzotriazole,
2-(2'-hydroxy-5'-methylphenyl)-5-carboxylic acid butyl ester benzotriazole,
2-(2'-hydroxy-5'-methylphenyl)-5,6-dichlorobenzotriazole,
2-(2'-hydroxy-5'-methylphenyl)-5-ethylsulfonebenzotriazole,
2-(2'-hydroxy-5'-t-butylphenyl)-5-chlorobenzotriazole,
2-(2'-hydroxy-5'-t-butylphenyl)benzotriazole,
2-(2'-hydroxy-5'-aminophenyl)benzotriazole,
2-(2'-hydroxy-3'-5'-dimethylphenyl)benzotriazole,
2-(2'-hydroxy-3',5'-dimethylphenyl)-5-methoxybenzotriazole,
2-(2'-methyl-4'-hydroxyphenyl)benzotriazole,
2-(2'-stearyloxy-3'-5'-dimethylphenyl)-5-methylbenzotriazole,
2-(2'-hydroxy-5-carboxylic acid phenyl)benzotriazole ethyl ester,
2-(2'-hydroxy-3'-methyl-5'-t-butylphenyl)benzotriazole,
2-(2'-hydroxy-3',5'-di-t-butylphenyl)-5-chlorobenzotriazole,
2-(2'-hydroxy-3'-t-butyl-5'-methylphenyl) -chlorobenzotriazole,
2-(2'-hydroxy-5'-methoxyphenyl)benzotriazole,
2-(2'-hydroxy-3',5'-di-t-butylphenyl)-5-chlorobenzotriazole,
2-(2'-hydroxy-5'-cyclohexylphenyl)benzotriazole,
210 2-(2'-hydroxy-4',5'-dimethylphenyl)-5-carboxylic acid benzotriazole butyl ester,
2-(2'-hydroxy-3',5'-dichlorophenyl)benzotriazole,
2-(2'-hydroxy-4',5'-dichlorophenyl)benzotriazole,
2-(2'-hydroxy-3',5'-dimethylphenyl)-5-ethylsulfonebenzotriazole,
2-(2'-hydroxy-4'-octoxyphenyl)benzotriazole,
2-(2'-hydroxy-5'-methoxyphenyl)-5-methylbenzotriazole,
2-(2'-hydroxy-5'-methylphenyl-5-carboxylic acid ester benzotriazole and
2-(2'-acetoxy-5'-methylphenyl)benzotriazole.

The amount of the ultraviolet absorber to be incorporated into the substrate film is within a range of from 0.02 to 8 parts by weight relative to 100 parts by weight of the substrate vinyl chloride resin. If the amount is less than 0.02 parts by weight, the weather resistance of the vinyl chloride resin film for agricultural use will not be adequately excellent. On the other hand, if the amount exceeds 8 parts by weight, it is likely to bleed out together with other resin additives on the surface of the film when the film is used, such being undesirable. Within the above range, particularly preferred is a range of from 0.1 to 3 parts by weight.

Now, the present invention will be described with reference to Examples. However, it should be understood that the present invention is by no means restricted to such specific Examples.

EXAMPLE 1 to 10 and COMPARATIVE EXAMPLES 1 to 5

(1) Preparation of acrylic resins

PREPARATION EXAMPLES 1 to 4

Into a reactor equipped with a thermometer, a stirrer, a reflux condenser and a nozzle for supplying starting materials, 100 parts by weight of isopropyl alcohol, 1.0 part by weight of benzoyl peroxide and 100 parts by weight of a mixture of monomers as identified in Table 1, were charged and reacted at 80° C. for 3 hours under stirring in a nitrogen gas stream. Then, 0.5 part by weight of benzoyl peroxide was further added, and the mixture was reacted at the same temperature for about 3 hours to obtain acrylic resins A to D.

(2) Preparation of coating compositions

To the products (acrylic resins A to D) obtained in the above Preparation Examples, the silane compound (A) of the type and the amount as shown in Table 2 was incorporated to obtain various coating compositions. However, in Comparative Example 2, the silane compound (A) was not incorporated. In Comparative Example 3, the acrylic resin (B) was not incorporated.

(3) Formation of coating layers

The coating compositions thus prepared were diluted with isopropyl alcohol so that the coated amounts after drying would be 3.0 g/m$^2$ (as solid content) and coated by a bar coating method on the surfaces of various resin films as identified in Table 2. In Comparative Example 1, no coating was applied and no coating film was formed.

The coated films were retained in a hot air at 100° C. for 3 minutes to evaporate the solvent and to conduct heat treatment simultaneously. However, in Comparative Example 5, no heat treatment was conducted after coating the coating composition and the solvent was permitted to evaporate by natural drying to form a dried coating layer.

(4) Evaluation of coating layers

Various properties of the coating layers formed on the films were evaluated by the following methods (1) Adhesiveness An adhesive tape was bonded to the coating layer side of each film, and when the adhesive tape was peeled off, the peeling state of the coating layer was visually observed.

The results are shown in Table 2. The evaluation standards were as follows.

○: The coating layer remained completely without any peeling.

○X: At least ⅔ of the coating layer remained without peeling.

Δ: At least ⅓ of the coating

X: The coating layer was completely peeled.

(2) Stain resistance I

Each comtaminant was deposited on the coating layer surface of the film, and the film was left at room temperature for 48 hours. Then, the contaminant was wiped off by absorbent cotton, whereupon traces were examined. The results are shown in Table 2. The evaluation standards were as follows.

⊙: No traces were observed.

○: Traces were observed at a part of the coating layer.

ΔTraces were observed at at least ⅔ of the coating layer.

X: Traces were observed over the entire coating layer.

(3) Stain resistance II

Each film was cut into a square of 10 cm × 10 cm, and a printed side of a copy taken by electrostatic copying machine or a heat sensitive copying machine was brought in intimate contact with the coating layer side (in Comparative Examples, one side of the film). In this state, the film-copy assembly was left under a load of 2 kg in an oven maintained at a temperature of 50° C. for 48 hours.

Then, the assembly was taken out from the oven, the load was removed, and the copy was peeled off, whereupon the degree of stain on the film surface was examined. The results are shown in Table 2. The evaluation standards were as follows.

◎: No traces were observed.

○: Traces were observed at a part of the coating layer.

Δ: Traces were observed at at least ⅔ of the coating layer.

X: Traces were observed over the entire surface of the coating layer.

TABLE 1

| Prep. Examples | Type of acrylic resin | Alkyl (meth)acrylate | | | | | | Alkenyl benzene | | | | Other α,β-ethylenically unsaturated monomer | | | | | |
|---|---|---|---|---|---|---|---|---|---|---|---|---|---|---|---|---|---|
| | | Monomer | Parts by weight | Monomer | Parts by weight | Monomer | Parts by weight | Monomer | Parts by weight | Monomer | Parts by weight | Monomer | Parts by weight | Monomer | Parts by weight | Monomer | Parts by weight |
| 1 | Resin A | MMA | 70 | BA | 30 | — | — | — | — | — | — | — | — | — | — | — | — |
| 2 | Resin B | EMA | 65 | EA | 20 | EHA | 12 | — | — | — | — | MA | 3 | — | — | | |
| 3 | Resin C | MMA | 33 | EA | 10 | — | — | ST | 30 | ST | 30 | AN | 25 | — | — | | |
| 4 | Resin D | — | — | — | — | — | — | ST | 70 | ST | 70 | AN | 30 | — | — | | |

Note: Abbreviation in Table 1
MMA: Methyl methacrylate
EMA: Ethyl methacrylate
BA: Butyl acrylate
EA: Ethyl acrylate
EHA: 2-Ethylhexyl acrylate
ST: Styrene
MA: Methacrylic acid
AN: Acrylonitrile

TABLE 2

| No. | Silane compound (A) Type | Silane compound (A) Parts by weight*1 | Acrylic resin (B) Type | Acrylic resin (B) Parts by weight*1 | Acrylic resin (B) Parts weight*1 | Types of molded product | Adhesiveness | Stain resistance I Lip stick | Stain resistance I Marker ink | Stain resistance II Electrostatic copy | Stain resistance II Heat sensitive copy |
|---|---|---|---|---|---|---|---|---|---|---|---|
| Example 1 | Tetramethoxy silane monomer | 20.0 | Nil | — | 10.0 | Low density polyethylene film NP, treated by corona surface treatment manufactured by Sekisui Chemical Co., Ltd | ○ | ○ | ○ | ◉ | ○ |
| Example 2 | Tetramethoxy silane tetramer | 20.0 | Nil | — | 10.0 | Saturated polyester film O type, manufactured by Teijin Limited | ○ | ◉ | ◉ | ◉ | ○ |
| Example 3 | Tetraethoxy silane tetramer (60% hydrolyzate) | 15.0 | Nil | — | 15.0 | Nylon 6 film Rayfan NO 1401, manufactured by Toray Gosei Film K. K. | ○ | ◉ | ◉ | ◉ | ◉ |
| Example 4 | Tetrabutoxy silane pentamer (100% hydrolyzate) | 15.0 | Methyltriethoxy silane monomer | 5.0 | 10.0 | Above polyethylene film NP, treated by corona surface treatment | ○ | ◉ | ◉ | ◉ | ◉ |
| Example 5 | γ-Aminopropyl-trimethoxy silane monomer | 15.0 | Nil | — | 15.0 | Above polyester film | ○ | ○ | ◉ | ○ | ○ |
| Example 6 | Tetramethoxy silane tetramer (80% hydrolyzate) | 7.0 | γ-Aminopropyl-trimethoxy silane monomer | 5.0 | 18.0 | Polyurethane film, Unilon S-FO manufactured by Nippon Unipolymer K. K. | ○ | ◉ | ◉ | ◉ | ◉ |
| Comparative Example 1 | Nil | — | Nil | — | — | Above polyethylene film | ○ | △ | × | △ | × |
| Comparative Example 2 | Nil | — | Nil | — | 30.0 | Above polyethylene film NP, treated by corona surface treatment | ○ | △ | × | △ | × |
| Comparative Example 3 | Tetramethoxy silane tetramer | 30.0 | Nil | — | — | Above polyester film | × | △ | △ | △ | △ |
| Comparative Example 4 | Tetraethoxy silane tetramer (60% hydrolyzate) | 15.0 | Nil | — | 15.0 | Above nylon 6 film | △ | ○ | △ | △ | △ |
| Comparative Example 5*2 | Tetramethoxy silane tetramer (80% hydrolyzate) | 7.0 | γ-Aminopropyl-trimethoxy silane monomer | 5.0 | 18.0 | Above polyurethane film | △ | △ | △ | △ | × |

| No. | Coating layer Silane compound (A) Type | Parts by weight*1 | Acrylic resin (B) Type | Parts by weight*1 | Hindered amine (C)*3 Type | Parts by weight*1 | Type of molded product | Adhesiveness | Stain resistance I Lip stick | Stain resistance I Marker ink | Stain resistance II Electrostatic copy | Stain resistance II Heat sensitive copy |
|---|---|---|---|---|---|---|---|---|---|---|---|---|
| Example 7 | Tetramethoxy silane tetramer | 20.0 | Resin B | 10.0 | C-1 | 0.5 | Low density polyethylene film NP, treated by corona surface treatment manufactured by Sekisui Chemical Co., Ltd | ○ | ◉ | ◉ | ◉ | ◉ |
| Example 8 | Tetramethoxy silane tetramer | 15.0 | Resin C | 15.0 | C-3 | 1.0 | Nylon 6 film Rayfan NO 1401, manufactured by Toray Gosei Film K. K. | ○ | ◉ | ◉ | ◉ | ○ |
| Example 9 | Tetraethoxy silane tetramer (60% hydrolyzate) | 15.0 | Resin B | 15.0 | C-2 | 0.5 | Saturated polyester film O type, manufactured by Teijin Limited | ○ | ◉ | ◉ | ◉ | ○ |
| Example 10 | Tetramethoxy silane tetramer | 15.0 | Resin B | 10.0 | C-1 | 1.0 | Above polyester film | ○ | ◉ | ◉ | ◉ | ○ |

TABLE 2-continued (80% hydrolyzate)

*1:
*2: Coating layer was formed by drying under natural conditions.
*3: C-1: Bis(2,2,6,6-tetramethyl-4-piperidyl)sebacate C-2: 4-(phenoxyacetoxy)-2,2,6,6-tetramethylpiperidine C-3: Tetrakis(2,2,6,6-tetramethyl-4-piperidyl)-butane-1,2,3,4-tetracarboxylate From Table 2, it is evident that the molded synthetic resin products of the present invention have excellent stain resistance, whereby it is possible to prevent the staining of the surface of the molded products and the deposition of e.g. dusts or foreign matters, and the beautiful outer appearance can be maintained for a long period of time.

EXAMPLES 11 to 20 and COMPARATIVE EXAMPLES 6 to 10

Now, Examples and Comparative Examples wherein the synthetic resins are vinyl chloride resins, will be given.

(1) Preparation of the substrate film

Polyvinyl chloride ($\overline{P}=1400$): 100 parts by weight
Dioctyl phthalate: 50 parts by weight
Epoxidized soybean oil: 3 parts by weight
Barium-zinc composite liquid stabilizer: 1.5 parts by weight
Barium stearate: 0.2 part by weight
Zinc stearate: 0.4 part by weight The above resin composition was mixed by a super mixer for 10 minutes and kneaded on mill rolls heated to 180° C. to obtain a soft vinyl chloride resin film having a thickness of 0.3 mm.

(2) Formation of coating layers

The silane compound, the acrylic resin and the hindered amine of the types and the amounts as identified in Table 3 were mixed, and isopropyl alcohol was added thereto so that the solid content would be 20% by weight to obtain coating compositions. The acrylic resins used were the same as shown in Table 1 for Examples 1 to 10 and Comparative Examples 1 to 5. In Comparative Example 2, no silane compound was incorporated. In Comparative Example 3, no acrylic resin was incorporated.

The above coating compositions were respectively coated on one side of the substrate films prepared in the above-mentioned manner, by means of #5 bar coater. The coated films were maintained in an oven of 130° C. for 3 minutes to evaporate the solvent and simultaneously conduct heat treatment. However, in Comparative Example 5, no heat treatment was conducted after the coating of the coating composition, and the solvent was evaporated by natural drying to obtain a dried coating layer. The amount of the coating layer of each film thus obtained was about 2.0 g/m² In Comparative Example 6, no coating layer was formed.

(3) Evaluation of the films

The adhesiveness was evaluated in the same manner as in Examples 1 to 10, and the stain resistance was evaluated in the same manner as in the stain resistance I in Examples 1 to 10. Further, the plasticizer migration test was conducted as follows.

Each of the eleven types of films was cut into a square of 10 cm×10 cm, and a polystyrene sheet having a thickness of 0.5 mm was brought in intimate contact with the coating layer side (in Comparative Example 6, one side of the film). In this state, the film-sheet assembly was left under a load of 2 kg in an oven maintained at 50° C. for 48 hours.

Then, the assembly was taken out from the oven, the load was removed, and the styrene sheet was peeled, whereupon the weight reduction of each of the eleven types of films was measured.

The weight reduction indicates that the smaller the numerical value, the smaller the migration of the plasticizer from the film surface The results of evaluation are shown in Table 3.

TABLE 3

| No. | Silane compound (A) Type | Silane compound (A) Parts by weight *1 | Coating layer Parts by weight *1 | Acrylic resin (B) Type | Acrylic resin (B) Parts by weight *1 | Hindered amine (C) *3 Type | Hindered amine (C) *3 Parts by weight *1 | Adhesiveness | Stain resistance Lip stick | Stain resistance Marker ink | Amount of migrated plasticizer (mg/100 cm²) |
|---|---|---|---|---|---|---|---|---|---|---|---|
| Example 11 | Tetramethoxy silane monomer | 15.0 | — | Resin A | 10.0 | | | ○ | ⊙ | ○ | 28 |
| Example 12 | Tetramethoxy silane tetramer | 15.0 | — | Resin B | 10.0 | | | ○ | ⊙ | ⊙ | 22 |
| Example 13 | Tetraethoxy silane tetramer (60% hydrolyzate) | 10.0 | — | Resin C | 15.0 | | | ○ | ⊙ | ⊙ | 17 |
| Example 14 | Methoxytriethoxy silane pentamer (100% hydrolyzate) | 5.0 | γ-Aminopropyl-trimethoxy silane monomer | 5.0 | Resin C | 15.0 | | | ○ | ⊙ | ○ | 18 |
| Example 15 | Tetramethoxy silane tetramer (80% hydrolyzate) | 7.0 | Tetramethoxy silane monomer | 5.0 | Resin A | 13.0 | | | ○ | ⊙ | ⊙ | 15 |
| Example 16 | γ-Aminopropyl-trimethoxy silane monomer | 15.0 | Nil | — | Resin B | 10.0 | | | ○ | ⊙ | ○ | 31 |
| Example 17 | Tetramethoxy silane tetramer | 20.0 | | | Resin B | 10.0 | C-1 | 0.5 | ○ | ⊙ | ⊙ | 20 |
| Example 18 | Tetraethoxy silane tetramer | 15.0 | | | Resin C | 15.0 | C-3 | 1.0 | ○ | ⊙ | ⊙ | 15 |
| Example 19 | Tetramethoxy silane tetramer | 15.0 | | | Resin B | 15.0 | C-2 | 0.5 | ○ | ⊙ | ⊙ | 15 |
| Example 20 | Tetramethoxy silane tetramer (60% hydrolyzate) | 20.0 | | | Resin B | 10.0 | C-1 | 1.0 | ○ | ⊙ | ⊙ | 12 |
| Comparative Example 6 | Nil | — | Nil | — | Nil | — | | | ○ | × | × | 96 |
| Comparative Example 7 | Nil | — | | | Resin A | 25.0 | | | ○ | △ | × | 57 |
| Comparative Example 8 | Tetramethoxy silane tetramer (60% hydrolyzate) | 25.0 | Nil | — | Nil | — | | | | △ | △ | 42 |
| Comparative Example 9 | Tetramethoxy silane tetramer | 15.0 | Nil | — | Resin D | 10.0 | | | △ | ○ | △ | 54 |
| Comparative Example 10 | Tetramethoxy silane tetramer | 7.0 | Tetramethoxy silane monomer | 5.0 | Resin A | 13.0 | | | × | △ | △ | 63 |

*2

From Table 3, it is evident that the molded vinyl chloride resin products of the present invention are excellent particularly in the migration resistance of the plasticizer and the stain resistance, whereby it is possible to prevent the staining of the surface of the molded products and the deposition of dusts or foreign matters, and the beautiful outer appearance can be maintained for a long period of time.

EXAMPLES 21 to 28 and COMPARATIVE EXAMPLES 11 to 15

Preparation of substrate film

The substrate film was prepared in the same manner as in Examples 11 to 20 and Comparative Examples 6 to 10.

Preparation of acrylic resins

E. Into a reactor equipped with a thermometer, a stirrer, a reflux condenser and a nozzle for supplying starting materials, 15 parts by weight of 2-hydroxyethyl methacrylate, 5 parts by weight of acrylic acid, 45 parts by weight of methyl methacrylate, 35 parts by weight of n-butyl acrylate, 10 part by weight of benzoylperoxide and 200 parts by weight of methyl ethyl ketone were charged, and reacted at 80° C. for 7 hours under stirring in a nitrogen stream to obtain an acrylic resin solution. This is designated as acrylic resin E.

F. Into the same reactor as used in process E, 10 parts by weight of 2-hydroxyethylmethacrylate, 3 parts by weight of methacrylic acid, 60 parts by weight of methylmethacrylate, 27 parts by weight of butyl methacrylate, 1 part by weight of benzoyl peroxide and 200 parts by weight of methyl ethyl ketone were charged and reacted in the same manner as in process E to obtain an acrylic resin solution. This was designated as acrylic resin F.

G. Into the same reactor as used in process E, 55 parts by weight of methyl methacrylate, 40 parts by weight of butyl methacrylate, 5 parts by weight of butyl acrylate, 1 part by weight of benzoyl peroxide and 200 parts by weight of methyl ethyl ketone were charged and reacted in the same manner as in process E to obtain an acrylic resin solution. This was designated as acrylic resin G.

Formation of coating layers

The silane compound and the acrylic resin of the types and the amounts as shown in Table 1 were mixed, and isopropyl alcohol was added thereto so that the solid content would be 20% by weight to obtain coating compositions. However, in Comparative Example 12, no silane compound was incorporated. In Comparative Example 13, no acrylic resin was incorporated.

The above coating compositions were coated, respectively, by means of #5 bar coater on one side of the substrate films prepared as described above. The coated films were maintained in an autoclave of 130° C. for one minute to evaporate the solvent. The amount of the coating layer of each film thus obtained was about 3 g/m² However, in Comparative Example 1, no coating layer was formed.

Evaluation of films

The properties of the films were evaluated in accordance with the following methods. The results are shown in Table 4.

Stain resistance: The stain resistance was evaluated in the same manner as stain resistance I in Examples 1 to 10.

Migration test of the plasticizer

The migration test of the plasticizer was conducted in the same manner as in Examples 11 to 20 and Comparative Examples 6 to 10. The results are shown in Table 4.

Peeling properties (sticking properties): Each of 13 types of films was cut into a strip of 5 cm in width and 20 cm in length, and the strip was alternately folded every 5 cm in a direction perpendicular to the longitudinal direction. In such a state, the folded strip was left under a load of 2 kg from above in an oven maintained at 50° C. for one hour. The strip was taken out from the oven, the load was removed, and the film was peeled, whereby the peeling properties were examined. The evaluation standards were as follows.

⊚ : Readily peeled without any resistance.

Δ: Slight resistance was observed.

X: Substantial resistance was observed and a substantial force was required for peeling.

TABLE 4

| No. | Coating layer | | Blend ratio of X:Y (weight ratio of solid contents) | Peeling properties | Stain resistance | | Amount of migrated plasticizer (mg/100 cm²) |
|---|---|---|---|---|---|---|---|
| | Silane compound X | Acrylic resin Y | | | Lip stick | Marker ink | |
| Example 21 | Tetramethoxy silane tetramer | Acrylic resin E | 10:90 | ⊚ | ⊚ | ○ | 20 |
| Example 22 | Tetraethoxy silane tetramer | Acrylic resin E | 20:80 | ⊚ | ⊚ | ⊚ | 17 |
| Example 23 | Tetramethoxy silane tetramer | Acrylic resin E | 40:60 | ⊚ | ⊚ | ○ | 9 |
| Example 24 | γ-Aminopropyl-trimethoxy silane | Acrylic resin E | 40:60 | ⊚ | ○ | ⊚ | 25 |
| Example 25 | Tetraethoxy silane tetramer | Acrylic resin E | 50:50 | ⊚ | ⊚ | ⊚ | 14 |
| Example 26 | Tetramethoxy silane monomer | Acrylic resin E | 60:40 | ⊚ | ⊚ | ⊚ | 11 |
| Example 27 | Tetraethoxy silane tetramer | Acrylic resin E | 20:80 | ⊚ | ⊚ | ⊚ | 19 |
| Example 28 | Tetramethoxy silane tetramer (100% hydrolyzates) | Acrylic resin E | 50:50 | ⊚ | ⊚ | ⊚ | 10 |
| Comparative Example 11 | Nil | Nil | — | Δ | X | X | 85 |
| Comparative Example 12 | Nil | Acrylic resin E | 0:100 | ○ | Δ | Δ | 57 |
| Comparative Example 13 | Tetramethoxy silane tetramer | Nil | 100:0 | X | ○ | Δ | 36 |

TABLE 4-continued

| | Coating layer | | | | Stain resistance | | |
|---|---|---|---|---|---|---|---|
| No. | Silane compound X | Acrylic resin Y | Blend ratio of X:Y (weight ratio of solid contents) | Peeling properties | Lip stick | Marker ink | Amount of migrated plasticizer (mg/100 cm$^2$) |
| Comparative Example 14 | Tetraethoxy silane | Acrylic resin G | 40:60 | ⊙ | ○ | △ | 44 |
| Comparative Example 15 | Tetramethoxy silane monomer | Acrylic resin G | 60:40 | ⊙ | ○ | △ | 38 |

From Table 4, it is evident that the molded vinyl chloride resin products of the present invention have particularly excellent migration resistance of the plasticizer and the stain resistance, whereby it is possible to prevent the staining of the surface of the molded products and the deposition of dust or foreign matters, and the beautiful outer appearance can be maintained for a long period of time.

EXAMPLES 29 to 35 and COMPARATIVE EXAMPLES 16 to 21

Preparation of substrate film
  Polyvinyl chloride ($\bar{P}$=1400): 100 parts by weight
  Dioctylphthalate: 50 parts by weight
  Epikote 828 (Tradename for epoxy compound, manufactured by U.S. Shell Co.): 1 part by weight
  Tricresyl phosphate (Phosphate plasticizer): 5 parts by weight
  Barium stearate (Stabilizer): 0.2 part by weight
  Zinc stearate: 0.4 part by weight
  Sorbitan monolaurate: 1.5 parts by weight The above resin composition was mixed with the ultraviolet absorbers of the types and the amounts as identified in Table 5. However, in Comparative Examples 16 and 17, no ultraviolet absorber was incorporated.

Each composition was stirred and mixed by a super mixer for 10 minutes and then kneaded on mill rolls heated to 180° C. to prepare a substrate film having a thickness of 0.15 mm.

Preparation of acrylic resins

H. Into a reactor equipped with a thermometer, a stirrer, a reflux condenser and a nozzle for supplying starting materials, 45 parts by weight of methyl methacrylate, 35 parts by weight of isopropylacrylate, 15 parts by weight of 2-hydroxyethyl methacrylate, 5 parts by weight of acrylic acid, 1 part by weight of benzoyl peroxide and 200 parts by weight of methyl ethyl ketone were charged and reacted at 80° C. for 7 hours under stirring in a nitrogen stream to obtain an acrylic resin solution. This was designated as acrylic resin H.

I. Into the same reactor as used in process H, 60 parts by weight of methyl methacrylate, 28 parts by weight of n-butyl methacrylate, 10 parts by weight of 2-hydroxyethylmethacrylate, 2 parts by weight of methacrylic acid, 1 part by weight of benzoyl peroxide and 200 parts by weight of methyl ethyl ketone were charged and reacted in the same manner as described in process H to obtain an acrylic resin solution. This was designated as acrylic resin I.

J. Into the same reactor as used in process H, 70 parts by weight of methylmethacrylate, 20 parts by weight of ethyl acrylate, 10 parts by weight of cyclohexyl acrylate, 1 part by weight of benzoyl peroxide and 200 parts by weight of methyl ethyl ketone were charged and reacted in the same manner as in process H to obtain an acrylic resin solution. This was designated as acrylic resin J.

K. Into the same reactor as used in process H, 70 parts by weight of methyl methacrylate, 25 parts by weight of 2-hydroxyethyl methacrylate, 5 parts by weight of acrylic acid, 1 part by weight of benzoyl peroxide and 200 parts by weight of methyl ethyl ketone were charged and reacted in the same manner as in process H to obtain an acrylic resin solution. This was designated as acrylic resin K.

L. Into the same reactor as used in process H, 45 parts by weight of methyl methacrylate, 35 parts by weight of ethyl acrylate, 20 parts by weight of cyclohexyl acrylate, 1 part by weight of benzoyl peroxide and 200 parts by weight of methyl ethyl ketone were charged and reacted in the same manner as in process H to obtain an acrylic resin solution. This was designated as acrylic resin L.

The glass transition temperature of each resin is as shown in Table 1 and is the value as calculated by the following equation.

$$\frac{1}{Tg} = \frac{W_1}{Tg_1} + \frac{W_2}{Tg_2} \cdots + \frac{W_n}{Tg_n}$$

where Tg is a glass transition temperature (absolute temperature) of a hydrophobic acryl resin, and each of $Tg_1, Tg_2, \ldots Tg_n$ is a glass transition temperature (absolute temperature) of the homopolymer of each of components $1, 2 \ldots n$, and each of $W_1, W_2, \ldots W_n$ is a weight ratio of each of components $1, 2 \ldots n$.

Formation of coating layers

The silane compound and the acrylic resin of the types and the amounts as identified in Table 5 were mixed, and isopropyl alcohol was added thereto so that the solid content would be 20% by weight to obtain coating compositions. However, in Comparative Example 18, no silane compound was incorporated. Further, in Comparative Example 19, no acrylic resin was incorporated.

The above coating compositions were respectively coated by #5 bar coater on one side of the substrate films prepared by the above method. The coated film was maintained in an oven of 130° C. for one minute to evaporate the solvent. The amount of the coating layer of each film '- was about 3 g/m$^2$ However, in Comparative Example 16, no coating layer was formed.

Evaluation of films

The properties of the films were evaluated in accordance with the following methods. The results are shown in Table 6.

Peeling properties (sticking resistance):
  The peeling properties were evaluated in the same manner as in Examples 21 to 28 and Comparative Examples 11 to 15.

Flexibility of the coating layers

Each film was cut into a strip having a width of 5 cm, and a length of 15 cm and alternately folded every 2 cm in the direction perpendicular to the lengthwise direction. In this state, the folded strip was left under a load of 2 kg in a constant temperature tank held at 15° C. for 24 hours. Then, the load was removed, and the folded film was spread, whereupon the outer appearance of the coating layer was visually examined. The results are shown in Table 6. The evaluation standards in this test were as follows.

⊚: No change was observed on the coating layer along the folding lines.

Δ: Cracks were observed slightly on the coating layer along the folding lines.

X: Cracks are substantially observed on the coating layer along the folding lines.

Outdoor spreading test:

Thirteen kinds of films were, respectively, put on roofed houses (width: 3m, length: 5 m, height: 1.5 m, inclination of the roof: 30° ) built on a test field in Mie-ken, Japan, so that the respective coating layers were located outside the houses. The outdoor spreading test was continued for a period of two years from June 1985 to May 1987.

With respect to each spread film, the outer appearance and the elongation maintaining rate of the film were measured, and the dust-resistance of each film was evaluated during the spreading test, as follows.

Outer appearance of the films

The outer appearance was visually observed. The evaluation standards were as follows.

O: No change on the outer appearance, such as no color change, was observed.

◯: A partial change on the outer appearance, such as slight color change, was observed.

Δ: A substantial change on the outer appearance, such as color change, was observed.

X: Color change was observed on the entire surface.

Elongation maintaining rate of films

Represented by the value obtained by the calculation in accordance with the following formula:

$$\frac{\text{Elongation of the film after the outdoor spreading}}{\text{Elongation of the film before the outdoor spreading}} \times 100(\%)$$

Dust resistance

Represented by the value obtained by the calculation in accordance with the following formula:

$$\frac{\text{Light transmittance of the film periodically measured after the outdoor spreading}}{\text{Light transmittance of the film before the outdoor spreading}^*} \times 100(\%)$$

*Transmittance of light having an wave length of 555 mμm (as measured by EPS-2U model, manufactured by Hitachi LTD.)

The evaluation of the results of the measurement was as follows.

⊚: The light transmittance after spreading is at least 90% of the light transmittance before the spreading.

O: The light transmittance after the spreading is within a range of from 70 to 89% of the light transmittance before the spreading.

Δ: The light transmittance after the spreading is within a range of from 50 to 69% of the light transmittance before the spreading.

X: The light transmittance after the spreading is less than 50% before the spreading.

TABLE 5

| No. | Substrate film Ultraviolet absorber Type | Parts by weight | Coating layer Silane compound A | Acrylic resin B Resin | Glass transition temp. | Ratio of A:B (weight ratio of solid contents) |
|---|---|---|---|---|---|---|
| Example 29 | 2,4-dihydroxybenzophenone | 0.5 | Tetramethoxy silane tetramer | Acrylic resin H | 50° C. | 20:80 |
| Example 30 | 2-(2'-hydroxy-3'-t-butyl-5'-methylphenyl)-5-chlorobenzotriazole | 0.5 | Tetraethoxy silane tetramer | Acrylic resin I | 72° C. | 20:80 |
| Example 31 | 2-(2'-hydroxy-4'-octoxyphenyl)-benzotriazole | 0.5 | γ-Aminopropyl-trimethoxy silane | Acrylic resin J | 60° C. | 20:80 |
| Example 32 | 2,2'-dihydroxy-4-methoxybenzophenone | 0.5 | Tetramethoxy silane tetramer | Acrylic resin H | 50° C. | 40:60 |
| Example 33 | 2,2'-dihydroxy-4-methoxybenzophenone | 0.5 | Tetraethoxy silane tetramer | Acrylic resin J | 60° C. | 70:30 |
| Example 34 | 2-(2'-hydroxy-3'-t-butyl-5'-methylphenyl)-5-chlorobenzotirazole | 0.5 | Tetraethoxy silane tetramer (60% hydrolyzates) | Acrylic resin I | 72° C. | 20:80 |
| Example 35 | 2,2'-dihydroxy-4-methoxybenzophenone | 0.5 | Tetramethoxy silane tetramer (100% hydrolyzates) | Acrylic resin H | 50° C. | 40:60 |
| Comparative Example 16 | Nil | — | Nil | Nil | — | — |
| Comparative Example 17 | Nil | — | Tetramethoxy silane tetramer | Acrylic resin H | 50° C. | 20:80 |
| Comparative Example 18 | 2,4-dihydroxybenzophenone | 0.5 | Nil | Acrylic resin J | 50° C. | 0:100 |
| Comparative Example 19 | 2-(2'-hydroxy-3'-t-butyl-5'-methylphenyl)-5-chlorobenzotriazole | 0.5 | Tetraethoxy silane tetramer | Nil | — | 100:0 |
| Comparative Example 20 | 2,4-dihydroxybenzophenone | 0.5 | Tetramethoxy silane tetramer | Acrylic resin K | 84° C. | 20:80 |
| Comparative Example 21 | 2,2'-dihydroxy-4-methoxybenzophenone | 0.5 | Tetramethoxy silane tetramer | Acrylic resin L | 31° C. | 40:60 |

TABLE 6

| | Flexibility of coating layer | peeling properties | Elongation maintaining rate (%) | Dust resistance | | | | Outer appearance of film |
| --- | --- | --- | --- | --- | --- | --- | --- | --- |
| | | | | After 6 months | After 12 months | After 18 months | After 24 months | |
| Example 29 | ⊚ | ⊚ | 88 | ⊚ | ⊚ | ⊚ | ○ | ⊚ |
| Example 30 | ⊚ | ⊚ | 83 | ⊚ | ⊚ | ⊚ | ○ | ⊚ |
| Example 31 | ⊚ | ⊚ | 80 | ⊚ | ⊚ | ○ | ○ | ⊚ |
| Example 32 | ⊚ | ⊚ | 87 | ⊚ | ⊚ | ⊚ | ⊚ | ⊚ |
| Example 33 | ⊚ | ⊚ | 85 | ⊚ | ⊚ | ⊚ | ○ | ⊚ |
| Example 34 | ⊚ | ⊚ | 92 | ⊚ | ⊚ | ⊚ | ⊚ | ⊚ |
| Example 35 | ⊚ | ⊚ | 87 | ⊚ | ⊚ | ⊚ | ⊚ | ⊚ |
| Comparative Example 16 | — | ○ | 25 | △ | X | X | X | X |
| Comparative Example 17 | ⊚ | ⊚ | 41 | ⊚ | ○ | X | X | △ |
| Comparative Example 18 | ⊚ | ⊚ | 53 | ⊚ | ○ | △ | X | △ |
| Comparative Example 19 | ⊚ | X | 59 | △ | △ | X | X | ○ |
| Comparative Example 20 | X | ⊚ | 67 | ⊚ | ⊚ | △ | △ | ○ |
| Comparative Example 21 | ⊚ | △ | 62 | ○ | △ | △ | △ | △ |

As is evident from the foregoing Examples, the present invention provides the following effects and its practical value for agriculatural use is significant.

(1) The vinyl chloride resin film for agricultural use of the present invention does not substantially undergoes color change, deterioration of the physical properties or reduction of the dust resistance even when spread outdoors for a long period of time, and it is durable for use for a long period of time.

(2) With the vinyl chloride resin film for agricultural use of the present invention, the coating layer formed on the surface of the substrate film has excellent adhesion to the substrate film and is very fixible, whereby the coating layer is hardly susceptible to peeling and thus durable for use for a long period of time.

We claim:

1. A molded synthetic resin product comprising a synthetic resin substrate and a coating layer formed by heat treatment of a coating composition on the surface of the substrate, said coating composition comprising (A) a silane compound having a hydrolyzable group directly bonded to a silicon atom, and (B) an acrylic resin obtained by polymerizing a monomer selected from the group consisting of alkyl (meth)acrylates, or a mixture of such a monomer with an alkenyl benzene monomer, and a copolymerizable $\alpha,\beta$-ethylenically unsaturated monomer, wherein the ratio by weight of the silane compound (A) to the acrylic resin (B) is within a range of from 20:1 to 1:15.

2. The molded synthetic resin product according to claim 1, wherein the synthetic resin substrate is made of a vinyl chloride resin containing at least 20 parts by weight of a plasticizer relative to 100 parts by weight of the vinyl chloride resin.

3. The molded synthetic resin product according to claim 1, wherein the silane compound (A) is a monomer or polymer of a tetraalkoxysilane of the formula $(R^1O)_3Si[OSi(OR^2)_2]_n(OR^3)$ wherein each of $R^1$, $R^2$ and $R^3$ which may be the same or different, is an alkyl group, an aryl group, an alkylaryl group, an arylalkyl group, an aryloxyalkyl group or an alkyloxyalkyl group, and n is 0 or a positive integer, or such a compound with its hydrolyzable group hydrolyzed.

4. The molded synthetic resin product according to claim 1, wherein said mixture contains at least 10% by weight of an alkyl (meth)acrylate.

5. The molded synthetic resin product according to claim 1, wherein the synthetic resin substrate is a soft vinyl chloride resin film containing an ultraviolet absorber.

6. The molded synthetic resin product according to claim 5, wherein the ultraviolet absorber is a benzophenone compound, a benzotriazole compound or a mixture thereof.

* * * * *